(12) United States Patent
Beach (10) Patent No.: US 10,450,080 B1
(45) Date of Patent: Oct. 22, 2019

(54) VARIABLE FREQUENCY POWER SYSTEM FOR HYBRID ELECTRIC AIRCRAFT PROPULSION

(71) Applicant: U.S.A., as represented by the Administrator of the National Aeronautics and Space Administration, Washington, DC (US)

(72) Inventor: Raymond F. Beach, North Olmsted, OH (US)

(73) Assignee: United States of America as Represented by the Administrator of National Aeronautics and Space Administration, Washington, DC (US)

( * ) Notice: Subject to any disclaimer, the term of this patent is extended or adjusted under 35 U.S.C. 154(b) by 752 days.

(21) Appl. No.: 15/082,350

(22) Filed: Mar. 28, 2016

(51) Int. Cl.
| | |
|---|---|
| *B64D 27/04* | (2006.01) |
| *B64D 27/24* | (2006.01) |
| *B64D 27/10* | (2006.01) |
| *B64D 27/02* | (2006.01) |

(52) U.S. Cl.
CPC ............ *B64D 27/24* (2013.01); *B64D 27/10* (2013.01); *B64D 2027/026* (2013.01); *Y10S 903/906* (2013.01); *Y10S 903/96* (2013.01)

(58) Field of Classification Search
CPC .................... B64D 27/24; B64D 2027/026
See application file for complete search history.

(56) References Cited

U.S. PATENT DOCUMENTS

| | | | | |
|---|---|---|---|---|
| 5,083,077 | A * | 1/1992 | Wallace ................. | H02P 9/007 318/729 |
| 7,645,174 | B2 * | 1/2010 | Chung .................. | B63H 21/12 440/6 |
| 9,667,232 | B2 * | 5/2017 | Kuznetsov .............. | H02J 3/30 |
| 9,780,709 | B2 * | 10/2017 | Hardwicke, Jr. ....... | H02P 9/007 |
| 9,837,996 | B2 * | 12/2017 | Kuznetsov .............. | H03K 3/45 |
| 10,107,260 | B2 * | 10/2018 | Ritter ................... | F03D 7/0288 |
| 10,113,533 | B2 * | 10/2018 | Menke ................. | F03D 7/0296 |
| 2018/0051584 | A1 * | 2/2018 | Malkamaki ............ | F01D 15/10 |
| 2018/0058242 | A1 * | 3/2018 | Malkamaki ........... | F01D 13/003 |
| 2018/0252158 | A1 * | 9/2018 | Malkamaki .............. | F02C 1/06 |

* cited by examiner

*Primary Examiner* — Brian M O'Hara
*Assistant Examiner* — Michael B. Kreiner
(74) *Attorney, Agent, or Firm* — Robert H. Earp, III; William M. Johnson (57) ABSTRACT

A hybrid propulsion system for an aircraft is provided that includes a turbine engine, a first electric machine assembly connected to the turbine engine, a second electric machine assembly driven by the first electric machine assembly, and multiple third electric machine assemblies driven by the first electric machine assembly, wherein the multiple third electric machines provide a thrust output to propel the aircraft.

13 Claims, 4 Drawing Sheets

FIG.4

VARIABLE FREQUENCY POWER SYSTEM FOR HYBRID ELECTRIC AIRCRAFT PROPULSION

ORIGIN OF THE INVENTION

The invention described herein was made by an employee of the United States Government and may be manufactured and used by or for the Government for Government purposes without the payment of any royalties thereon or therefor.

CROSS-REFERENCE TO RELATED APPLICATIONS

This application claims the benefit of U.S. Provisional Patent application Ser. No. 62/138,640 entitled "NOVEL VARIABLE FREQUENCY POWER SYSTEM FOR HYBRID ELECTRIC AIRCRAFT PROPULSION" filed on Mar. 26, 2015. The entirety of the above-noted application is incorporated herein by reference.

BACKGROUND

The aircraft propulsion system design process seeks to achieve the best overall system-level performance, weight, and cost for a given propulsion design. For example, current systems over the last 50-60 years have been finding ways to improve the efficiency of the aircraft propulsion system. Currently, these improvements result in a very small (e.g., less than 1%) increase in engine efficiency/performance. Further, the cost to reach such a small increase is substantial.

Still further, more and more electric aircraft technology that use electric actuation for flight control surfaces, and 270V dc for the power system have suffered problems due to regenerative energy that occurs when the electric actuator is back driven by the airstream. This causes regenerative energy to be produced by the electric actuator and increases the bus voltage unless absorbed or dissipated. In order to handle this problem clamping resistors are used to dissipate the energy, but must be cooled by emersion in the fuel tank. Emersion in the fuel tank then requires fuel reserves, limiting the mission capability. One alternative is to use batteries and supercapacitors that could recover the energy and reuse as peaking power. This, however, requires significant additional weight for the power electronics.

SUMMARY

The following presents a simplified summary in order to provide a basic understanding of some aspects of the innovation. This summary is not an extensive overview of the innovation. It is not intended to identify key/critical elements or to delineate the scope of the innovation. Its sole purpose is to present some concepts of the innovation in a simplified form as a prelude to the more detailed description that is presented later.

In one aspect of the innovation, the innovation overcomes the above mentioned disadvantages by providing an innovative a hybrid propulsion system for an aircraft that includes a turbine engine, a first electric machine assembly connected to the turbine engine, a second electric machine assembly driven by the first electric machine assembly, and a plurality of third electric machine assemblies driven by the first electric machine assembly, wherein the plurality of third electric machines provide a thrust output to propel the aircraft.

To accomplish the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

DETAILED DESCRIPTION

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

While specific characteristics are described herein (e.g., thickness), it is to be understood that the features, functions and benefits of the innovation can employ characteristics that vary from those described herein. These alternatives are to be included within the scope of the innovation and claims appended hereto.

While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter may be implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. The order in which one or more or all of the operations are described should not be construed as to imply that these operations are necessarily order dependent. Alternative ordering will be appreciated based on this description. Further, not all operations may necessarily be present in each embodiment provided herein.

As used in this application, "or" is intended to mean an inclusive "or" rather than an exclusive "or." Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first," "second," or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising," "comprises," "including," "includes," or the like generally means comprising or including.

The innovation disclosed herein and illustrated in the figures overcomes the above mentioned disadvantages by providing an aircraft propulsion system that improves efficiency/performance and is cost effective. The innovative hybrid electric aircraft propulsion system introduces multi mega-watt electric power systems as a link between aircraft power provided by the turbine or batteries/fuel cells and an aircraft propulsion system. The innovative propulsion system utilizes modified electric machines and a variable frequency power system to significantly decrease an estimated 85% of the weight of the power electronics system while still providing high peak power and nominal power capability. The system operates at a high frequency with settingless protection, which allows fast determination and clearance of faults. This configuration further reduces the protection system weight by more than approximately 50% and provides improved reliability through minimization of collateral damage.

Figure 1:
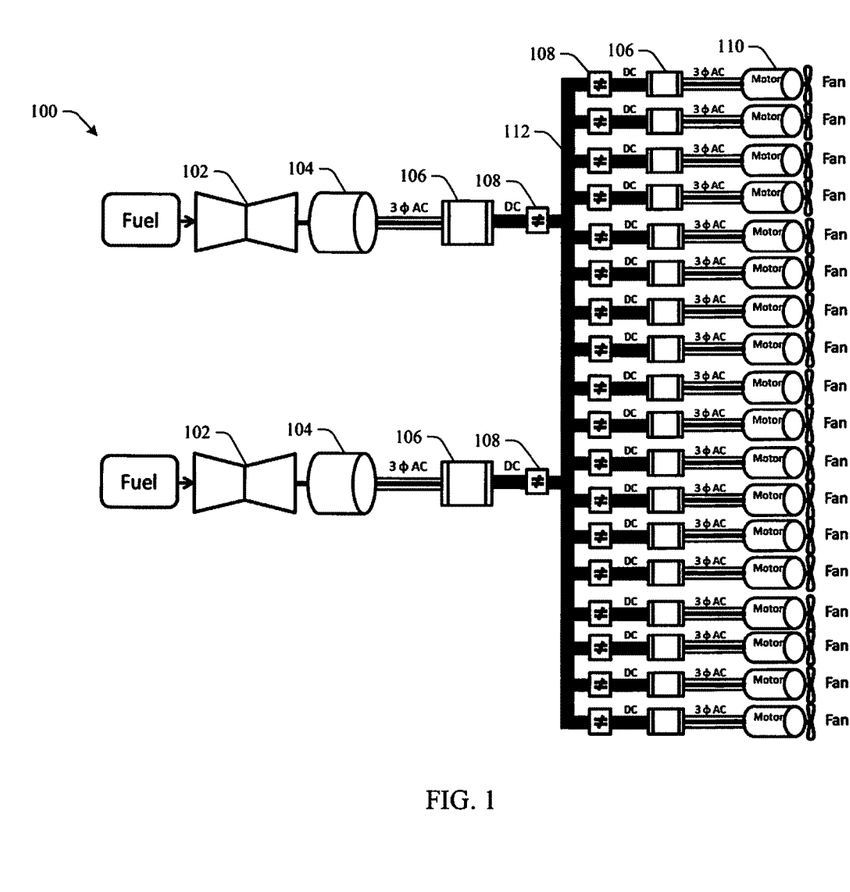
FIG. 1 is an illustration of a baseline hybrid aircraft propulsion system in accordance with an aspect of the innovation.

Referring to FIG. 1, alternating current power systems predominate in utility power systems around the world due to the ease with which the power can be transformed/converted and the use of electrical machines to produce AC power. The electric aircraft system, which is a direct analogy to the utility power system, is a multi-megawatt flying micro-grid that converts mechanical energy to electric energy via generators, and electric energy to mechanical energy via motor driven fans. A block diagram of an innovative baseline hybrid electric propulsion power system 100 is illustrated in FIG. 1. The system 100 includes turbine engines 102, generators 104, rectifiers or inverters 106, circuit protection devices 108, propulsors 110, and a distribution system 112.

The baseline hybrid electric propulsion power system 100, however, requires processing all the generated power through the rectifier 104 at the power source, at the inverter 104, and at the motor 110. In addition, in the event of a failure at one of the propulsors 110, the system 100 interrupts the voltage and current for within the distribution system 112. Still further, converting the voltage from AC to DC for the DC portion of the system requires additional power electronics, which adds cost and weight. Finally, the addition of battery energy storage or super-capacitors requires additional full power processing for charge and discharge of energy.

Figure 2:
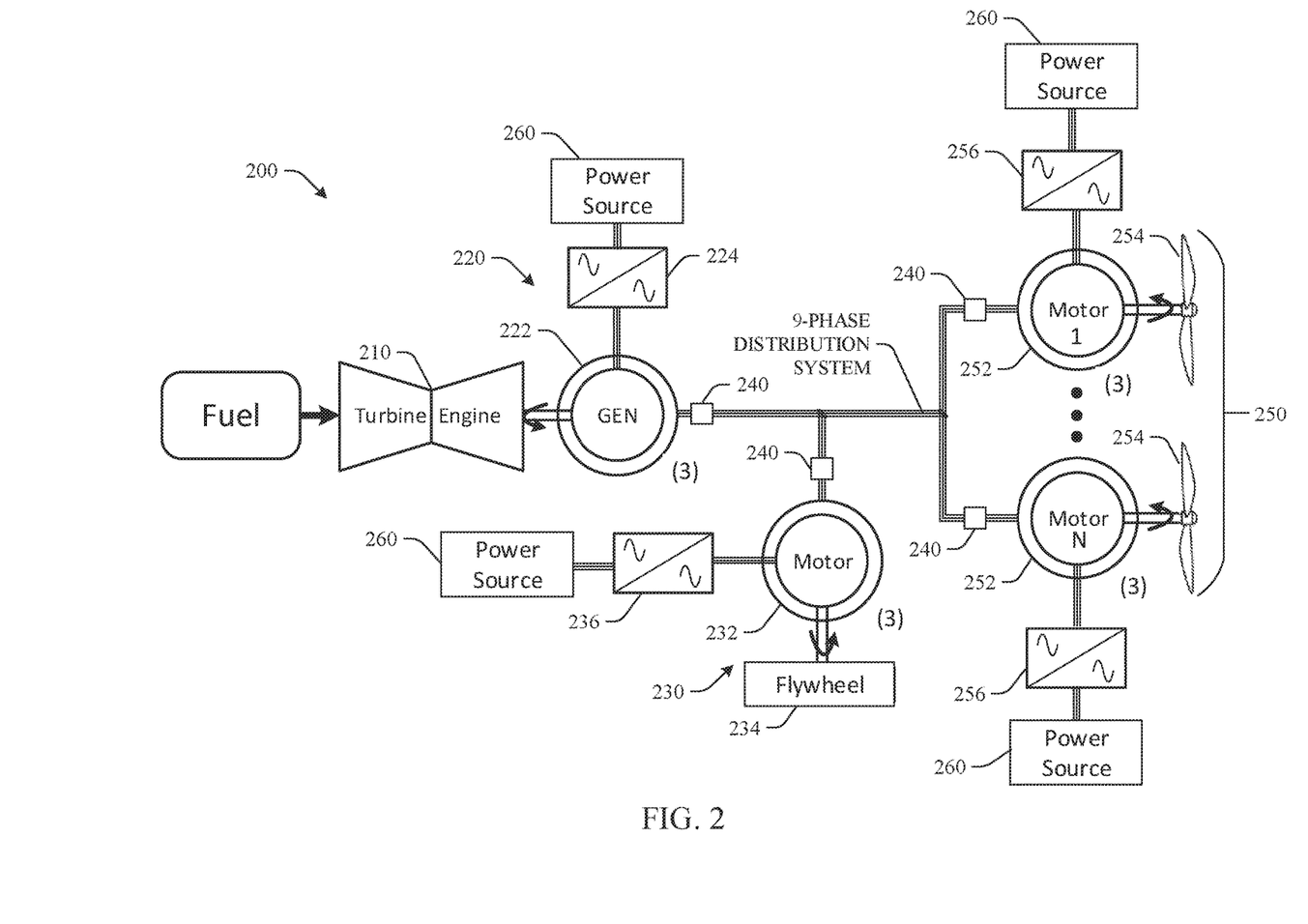
FIG. 2 is an illustration hybrid aircraft propulsion system in accordance with an aspect of the innovation.

FIG. 2 illustrates an innovative propulsion system that overcomes the above mentioned disadvantages by providing an alternative variable frequency, doubly fed machine aircraft propulsion system (hereinafter "propulsion system") 200 in accordance with an aspect of the innovation. The innovative propulsion system 200 utilizes the variation in aircraft throttle settings to produce a high voltage, variable frequency 9-phase AC distribution system, where the doubly fed electric machines (e.g., generator, motors, propulsors, flywheel, etc.) are used for all the electric rotating machines. Doubly fed electric machines significantly reduce the weight of the power electronics by minimizing the required power processing as compared to the baseline system illustrated in FIG. 1. For example, a 30% operating range around the throttle settings requires only 15% power processing for a rotor field control, thereby providing a potential weight saving of 85%, which also leads to an additional significant savings in thermal management and structural support.

In addition, doubly fed electric machines have two active winding sets. An active winding set (or armature winding set) has at least two AC phases with independent electrical ports, which is necessary for the production of a rotating or moving magnetic field with an electromotive force that actively participates in the energy conversion process. Since both winding sets of a doubly fed electric machine actively participate in the energy conversion process, a doubly fed electric machine operates to twice synchronous speed or twice the constant torque range with a given frequency of excitation. As a result, both armature winding sets contribute to electromechanical power production.

Further, the use of doubly fed electric machines, which include multiple pole pairs on the rotor, facilitates the use of a high frequency AC system, setting-less protection zones, and hybrid switches for fault clearance, which provide a significant reduction (e.g., approximately 50%) in switchgear mass. In addition, rapid, zero energy fault isolation significantly reduces the potential for collateral damage by providing a system that cannot produce faults with enough energy to cause collateral damage to the aircraft structure. More specifically, utilizing a hybrid switch that combines a mechanical contact for high efficiency with a solid state device to switch off at a zero voltage crossing of the high frequency AC provide a means of preventing collateral damage due to electric faults.

In addition, in current systems, pilot throttle settings cause the electric generator to produce a variable voltage and variable frequency, which causes electric driven fans (propulsors) to vary their speed proportional to and in synchronous with pilot commands. The doubly fed electric machines of the innovative propulsion system 200, on the other hand, allows for field excitation that can cause variable frequency or variable speed operation around the commanded throttle setting. Thus, both sub-synchronous and super-synchronous operation can be obtained using limited field excitation power provided through power converters.

Still referring to FIG. 2, the propulsion system 200 is a hybrid 9-phase, variable frequency AC system that includes a turbine engine 210, a first electric machine assembly comprised of a generator assembly 220 connected to the turbine engine 210, a second electric machine assembly comprised of an energy storage assembly 230, multiple hybrid switches 240, and multiple third electric machine assemblies comprised of multiple propulsor assemblies (propulsors) 250. Multiple rotor excitation devices (e.g., AC/AC converter, rectifier, etc.) are provided to excite the rotor of the doubly fed electric machines, as will be described further below. The rotor excitation devices are powered by a power source 260, such as but not limited to DC power, powered drawn from another system on the aircraft, batteries, etc.

The 9-phase distribution system includes three 3-phase systems that are phase shifted with respect to each other and are physically and electrically connected such that the three 3-phase systems operate as one system. Thus, the generator 220, the energy storage assembly 230, and each propulsor 250 shown in the figure represents three of each device. In other words, there are three electric machine devices for each for each electric machine device shown in the figure, as indicated by the number "3" in the figure. It is to be understood that the innovative propulsion system is not limited to a 9-phase distribution system. Additional phases can be implemented to further increase the efficiency/performance of the system.

In addition, the illustration shown in FIG. 2 represents just one propulsion system for the aircraft. The aircraft may be designed such that there may be multiple propulsion systems on the aircraft. Thus, it is to be understood, that the propulsion system 200 illustrated in FIG. 2 is a simplified version of the overall aircraft propulsion system and is, thus, for illustrative purposes only and is not intended to limit the scope of the innovation. It is also to be understood, that the system disclosed herein may be used for other applications on the aircraft. For example, the system may be used to operate doubly fed electric machines that operate auxiliary systems on the aircraft, such as but not limited to, the heating and cooling system, the refrigeration system, lighting, etc.

The generator assembly 220 includes a first electric machine comprised of a generator 222 and a generator (first) excitation device 224. As mentioned above, the generator 222 and the excitation device 224 actually represents three generators each connected to an excitation device where each generator is connected to a 3-phase system, thus, making up the 9-phase system. Although, each 3-phase system can be electrically isolated, the propulsion system 200 operates the three generators as one electric machine. Thus, all three generators are locked together so that they operate at the same frequency. As a result, as the pilot adjusts the throttle or activates the generator excitation device 224, the reaction (e.g., change in frequency, speed, etc.) from each generator 222 is the same.

The energy storage assembly 230 stores energy for later use and includes a second electric machine comprised of an energy storage motor 232, a flywheel 234 attached to the motor 232, and an energy storage excitation device (second) 236 that excites the motor 232. The flywheel 234 as an energy storage device has several advantages. First, the flywheel 234 can track the propulsion system as the pilot increases the throttle thereby increasing the frequency. Second, prior to takeoff when there is no load on the turbine engine 210, the pilot may activate the excitation device 236, which excites the motor 232 thereby, causing the flywheel 234 to spin and, thus, store mechanical energy. In addition, the flywheel 234 can be used on any hybrid electric aircraft that uses electric power for actuation or propulsion. Still further, since the flywheel is an alternating current energy storage device, its application would use an AC power system instead of the 270V DC. In addition, using the flywheel as energy storage coupled with a doubly fed electric machine driving the flywheel, allows for an energy storage buffer/accumulator whose speed corresponds to the commanded throttle settings.

The propulsor assemblies 250 provide the thrust to the aircraft and include a third electric machine comprised of a propulsion motor 252, a propeller or ducted fan 254 attached to the propulsion motor 252, and a field excitation device (third) 256 that excites the propulsion motor 252. Like the generator mentioned above, each propulsion motor 252 and each field excitation device 256 actually represents three propulsion motors each connected to an excitation device where each propulsion motor is connected to a 3-phase system, thus, making up the 9-phase system. Again, although each 3-phase system can be electrically isolated, the propulsion system 200 operates the three propulsion motors like one electric machine. Thus, all propulsion motors are locked together so that they operate at the same frequency, speed, etc. As a result, as the pilot adjusts the throttle or activates the field excitation device 256, the reaction (e.g., change in frequency, speed, etc.) from each propulsion motor 222 is the same.

As illustrated in FIG. 2, the number of propulsion motors 252 ranges from 1 to N. The number of propulsion motors 252 is based on several design factors, such as but not limited to, size of the aircraft, weight of the aircraft, weight of cargo/passengers that the aircraft will carry, intended speed of the aircraft, etc. The propulsion motors 252 are distributed within or on the aircraft so as to create a balanced or even output thrust.

In addition, the propulsion motors 252 are distributed such that every other propulsion motor 252 is controlled by a different system and, hence, a different turbine engine. For example, if the aircraft contained two propulsion systems (system 1 and system 2), half the propulsion motors 252 would be controlled by system 1 and the other half by system 2. The propulsion motors 252 are physically distributed or located within or on the aircraft such adjacent motors are controlled by the other system. In other words, the propulsion motors are interleaved. Thus, motor 1 is controlled by system 1, motor 2 by system 2, motor 3 by system 1, etc. Therefore, in the event of a failure by one system, the other system would control the corresponding propulsion motors that are equally distributed to thereby provide a balanced thrust output so as to facilitate a safe landing without the pilot having to compensate for an unbalanced thrust output.

For example, all twin engine aircraft have to be capable of handling the worst case engine out scenario, which is failure immediately after takeoff. The remaining engine needs to be capable of providing thrust to allow the aircraft to climb out, at lower rate, and return to the airport and land. Existing aircraft have to contend with the high torque on the aircraft due to the loss of thrust on one side. This torque includes a component due to the engine thrust and the torque produced by the rotating engine. The innovative propulsion system overcomes the issue of unbalanced torque, since the distributed propulsors are interleaved with power alternating from the port and starboard engines. Interleaving also allows utilization of differential speed control since the remaining power propulsors are on both sides of the air vehicle.

Figure 3:
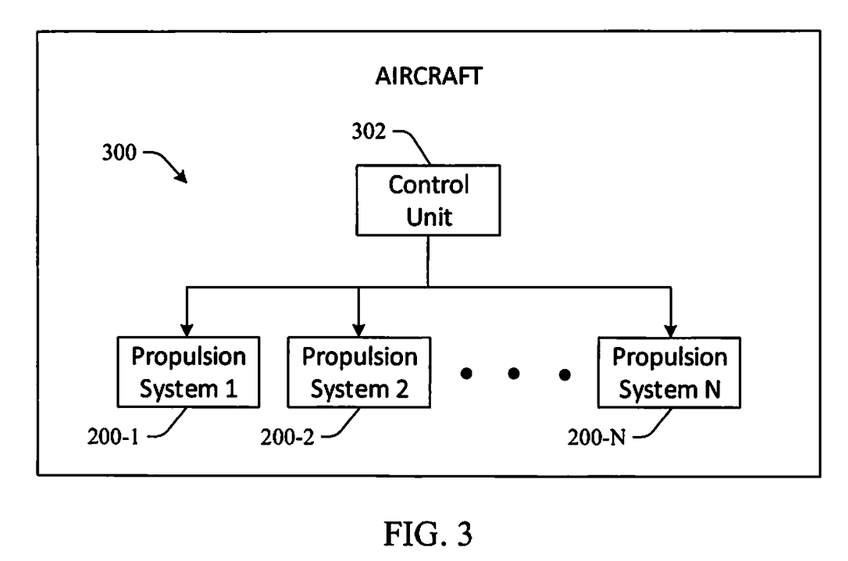
FIG. 3 is a block diagram illustration of a control system for the hybrid aircraft propulsion system in accordance with an aspect of the innovation.

FIG. 3 is an illustration of a digital control system 300 that includes a digital control unit 302 that provides control between the pilot commands and the propulsion system or systems 200-1 ... 200-N. Digital control allows the fields on the generator and the propulsors to be cross linked to provide the correct control authority to allow operation of the electric machines within their electro-magnetic torque producing capabilities. In addition, the digital control used to cross link the generator and propulsors is also used to control the flywheel energy storage unit allowing controlled charge and discharge of the flywheel unit within the electro-magnetic torque capability of the flywheel.

Operation and benefits of the propulsion system 200 at the various stages of aircraft operation (e.g., start-up through shut-down) will now be described. During start up, the fields on the generator and propulsors are inactive and the propellers or ducted fan are in a flat pitch orientation. Thus, the turbine engine can start with no electrical load. When the turbine engine is started and is capable of sustaining its own start load plus the electrical propulsion load, the generator field can be excited by the generator excitation device thereby producing an output voltage and frequency. Thus, the generator is run in a sub-synchronous mode at the largest negative frequency producing no electrical output. The turbine speed can now be increased with a corresponding increase in the voltage and frequency, while the downstream propulsor fields are excited.

Similarly, the propulsors can be run in a sub-synchronous operation along with a flat pitch orientation for the propeller or ducted fan allowing a further increase in the turbine speed without any propulsor load. For example, a 15% field excitation on the generator and propulsor would allow the turbine to speed up to 30% of full speed without any downstream load. In order to allow a gradual increase in load the generator field excitation can be increased via the field excitation from sub-synchronous to synchronous. During this period the propulsors will see an increasing voltage and frequency, causing the propulsors to start in a constant volts per hertz manner to minimum speed which corresponds to the generated voltage and frequency (15%). At this point the generator is running at synchronous and the propulsor is still running sub-synchronous. The propulsor fields can now be adjusted to increase the speed of the propulsor motors until they reach synchronous speed as well. Subsequent increase in throttle settings now will provide increased propulsor speeds, and with a change in the propeller or ducted fan pitch provide increased thrust.

During taxi operation, turning the aircraft can be obtained by varying the propulsor speeds and the pitch on the propellers or ducted fan on one side at super-synchronous versus sub-synchronous on the other or vice versa. For larger differential speeds than can be provided by just propulsors, the generators can also be run in super-synchronous or sub-synchronous manner providing differential speeds as large as 60%. Thus, in one example, for a 15% field excitation, a −15% at the generator and −15% at the propulsors on one side, and +15% at the generator and +15% at the propulsor on the other side provides a full 60% differential speed will be possible. If larger differential speeds are required the turbine throttle settings can be changed by increasing the differential thrust. The taxi turn function can be initiated through the use of the rudder pedals and a sensor in the deployed gear indicating the landed position. This same function can also be used in the turn and bank maneuver with different levels of performance based on in-flight versus landed operation.

During takeoff, by operating both the generator and propulsors in sub-synchronous operation and the pitch control for the propellers or ducted fan in the flat pitch orientation, the turbine engine can be allowed to spool up fast due to the light fan load, and retard full loading until the engine is at the most efficient operating point. This can also be accomplished by increasing the pitch angle for propellers/ducted fan and ramping the electrical frequency at the fastest rate at which the turbine engine can support the increasing fan load. Fast transient response can be obtained with higher losses, which may be desirable for in-flight operation and not required for takeoff.

For crosswind takeoff conditions the propulsors speed could be differentially controlled using the super/sub-synchronous operation immediately after takeoff to maintain runway heading while crabbing into the wind. This function can be combined with the pitch control for the propeller/ducted fan providing further thrust vector control and can also be used on crosswind landings.

During cruise operation, an optimum combination of engine speed, electrical frequency, and blade pitch is be utilized to get maximum performance and efficiency. Optimum electrical performance will also be driven by contingency conditions based on potential failures that could occur within the electrical and mechanical systems so that fast corrective response will occur in order to maintain vehicle operations.

During a turn and bank operation, the propulsors can be run in a super/sub-synchronous manner from port to starboard, and in conjunction with the propeller/ducted fan pitch, can provide enhanced turn and bank control. By sensing the gear down and compressed state versus the in-flight state, the blending of flight control surfaces, super/sub-synchronous propulsor speeds, and blade pitch can be optimized for performance.

Descent is initiated by slowly backing off on the propulsor load before allowing the descent of the aircraft. This would start with the propeller/ducted fan pitch moving to the feathered position allowing the electrical load to decrease to the torque required to maintain the propulsor speed at the desired level to allow for reacquisition of propulsion. By approaching the descent in this way the transition from high torque at speed to low torque at speed will allow the decrease in torque without regeneration onto the electrical bus. Reacquisition of torque will require the increase in power (torque) for the turbine, generator, and all propulsor motors, but will not require working against the rotating inertias. If the aircraft is a hybrid vehicle and not just turbo-electric, the energy storage device would be utilized to allow for clamping of the bus voltage during regeneration, as well as discharged of the energy storage during reacquisition of thrust reducing the dynamics associated with turbine and electrical system.

During landing and arrest, the propulsors can be operated in sub/super-synchronous operation on the port and starboard sides until the landing gear is depressed, allowing for the rudder function to correct crab and align with the runway. As with the descent phase the propulsors will need to slow from high torque at speed to low torque at speed and then back to high torque at speed as the blade pitch control reverses from full pitch to flat pitch and back to full pitch allowing thrust reversal. If thrust reversal occurs through a reversal duct the deployment of the duct will allow for reversal without the potential regeneration of energy onto the electrical bus.

Figure 4:
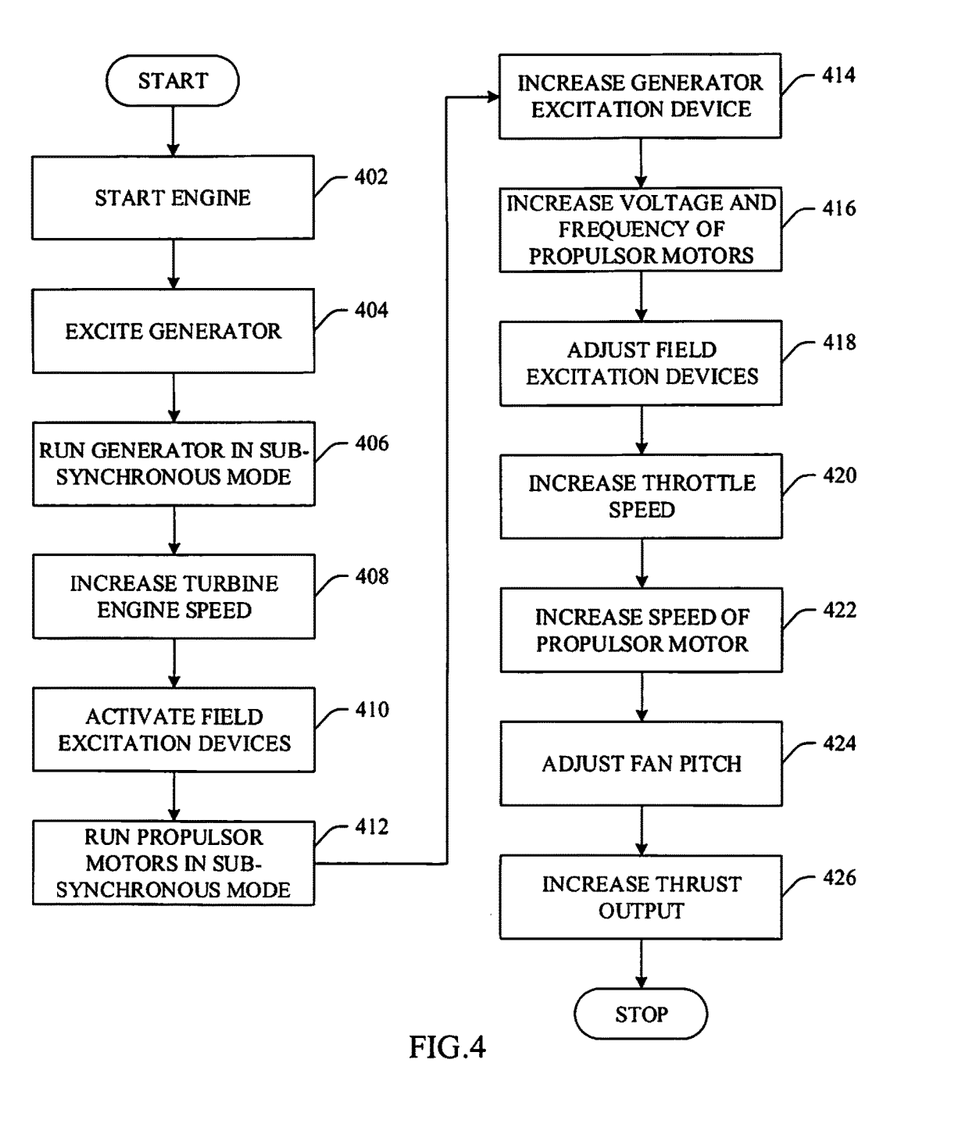
FIG. 4 is a block diagram illustrating a method of in accordance with an aspect of the innovation.

Referring to FIG. 4, a method 400 of starting and preparing the aircraft for take-off is shown in block diagram form and will now be described. At 402, the turbine engine 210 is started. As mentioned above, the fields on the generator 222 and propulsor motors 252 are inactive and the propellers or ducted fan 254 are in a flat pitch orientation, thus, there is no electric load on the turbine engine 210. At 404, once the turbine engine 210 is started and is capable of sustaining its own start load plus the electrical propulsion load, the generator field is excited by the generator excitation device 224 thereby producing a generator output voltage and frequency. At 406, the generator 222 is run in a sub-synchronous mode. At 408, the speed of the turbine engine 210 is increased with a corresponding increase in the voltage and frequency. At 410, the field excitation devices 256 are activated to excite the fields of the propulsor motors 252. At 412, the propulsor motors 252 are run in a sub-synchronous mode. At 414, the generator excitation device 224 is increased thereby increasing the frequency of the generator 222 from sub-synchronous to synchronous. At 416, the voltage and frequency of the propulsor motors 252 increase, causing the propulsors to start in a constant volts per hertz manner to minimum speed. At 418, the field excitation devices 256 adjust to increase the speed of the propulsor motors 252 until they reach synchronous speed. At 420, the throttle speed is increased. At 422, the speed of the propulsor motors 252 is increased. And at 424, a speed of the propeller or ducted fan 254 increases, which at 426 increases thrust output.

In the event of an electrical fault, the generators can be segmented so that a fault on the bus will only partially unload the turbine engine. This can be done by having each segment aggregated in three phase increments so that the loss of a segment will still provide a balanced load on the turbine and bearing system. Multi-phase systems also mitigate peak current inefficiencies typically associated with AC systems providing a DC like performance for the power distribution system. Each of the three phase segments continue through the distribution system into each of the propulsor motors. Thus, the propulsor motors are now segmented as well, so that an electrical fault in any location associated with an individual three phase segment can be isolated and affect only that segment. The power level for a segment is determined by design and will be driven by the engine out performance requirement. If each of the turbine engines needs to provide 50% more power or thrust after loss of an engine then nine phases with three segments would provide the necessary power for the mission abort. An electrical fault with this approach would only unload the turbine by 33%.

With field excitation the fault current operation can be controlled to predetermined levels or through field deactivation can be eliminated once detected for isolation. Since the segmented system is employed throughout the electrical system, loss of segment would still allow the remaining segments to operate at full power, providing significant redundancy for propulsion.

Additional benefits to the innovative propulsion system is that through the use of the field Excitation (magnitude, phase, frequency) steady state operation at high efficiency can be produced through vector control providing maximum torque at minimum current (90° torque angle). In conjunction with the torque control the voltage and current produced by the stator can be maintained in phase, reducing the reactive components within the power system. For transient operation the field control can be used to provide fast transient response allowing minimum trajectory time.

In addition, the field control allows sub-synchronous and super-synchronous operation of the flywheel for throttle slewing with limited power electronic processing. For regenerative power that will occur due to the use of the electric machines, the flywheel doubly fed machine will absorb the power at any given throttle setting through operation as an induction machine without having to process the power. This provides high peak power absorption without the need for large power electronics weight, thus solving the regenerative power problem.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A hybrid propulsion system for an aircraft comprising:
   a turbine engine;
   a first electric machine assembly connected to the turbine engine;
   a second electric machine assembly driven by the first electric machine assembly; and
   a plurality of third electric machine assemblies driven by the first electric machine assembly,
   wherein the plurality of third electric machines provide a thrust output to propel the aircraft;
   further comprising a plurality of multi-phase electrical distribution systems, wherein each of the plurality of multi-phase electrical distribution systems are electrically isolated from each other, but operate as a single multi-phase electrical distribution system.

2. The hybrid propulsion system of claim 1, wherein the first electric machine assembly includes a generator and a first rotor excitation device adapted to excite a rotor of the generator.

3. The hybrid propulsion system of claim 1, wherein the second electric machine assembly includes a first motor, an energy storage device attached to the first motor, and a second rotor excitation device adapted to excite a rotor of the first motor.

4. The hybrid propulsion system of claim 3, wherein the energy storage device is a flywheel.

5. The hybrid propulsion system of claim 1, wherein each of the plurality of third electric machine assemblies includes a third motor, a propeller, and a second rotor excitation device adapted to excite a rotor of the third motor.

6. The hybrid propulsion system of claim 1, wherein the plurality of multi-phase electrical distribution systems includes three 3-phase electrical distribution systems thereby creating a 9-phase electrical distribution system.

7. A propulsion system for an aircraft comprising:
   a first hybrid propulsion system including:
      a first turbine engine:
      a first generator assembly attached to the first turbine engine;

a first energy storage assembly driven by the first generator assembly; and a first plurality of propulsion assemblies driven by the first generator assembly; and a second hybrid propulsion system including:

a second turbine engine:

a second generator assembly attached to the second turbine engine;

a second energy storage assembly driven by the second generator assembly; and a second plurality of propulsion assemblies driven by the second generator assembly; and a 9-phase electrical distribution system that provides an electrical connection between the first hybrid propulsion system and the second hybrid propulsion system, wherein the first plurality of propulsion assemblies and the second plurality of propulsion assemblies provide a thrust output to propel the aircraft.

8. The propulsion system of claim 7, wherein the first generator assembly and the second generator assembly each include a generator and a first rotor excitation device adapted to excite a rotor of the generator.

9. The propulsion system of claim 7, wherein the first energy storage assembly and the second energy storage assembly each include an energy storage motor, an energy storage device attached to the energy storage motor, and a second rotor excitation device adapted to excite a rotor of the energy storage motor.

10. The propulsion system of claim 9, wherein the energy storage device is a flywheel.

11. The propulsion system of claim 7, wherein each of the first plurality of propulsion assemblies and each of the second plurality of propulsion assemblies include a propulsion motor, a propeller, and a second rotor excitation device adapted to excite a rotor of the propulsion motor.

12. The propulsion system of claim 7, wherein the first plurality of propulsion assemblies and the second plurality of propulsion assemblies are interleaved with each other, wherein in the event of a failure of the first propulsion system or the second propulsion system, the non-failing propulsion system provides a balanced thrust output.

13. The propulsion system of claim 7, wherein the 9-phase electrical distribution systems includes three 3-phase electrical distribution systems, wherein the 3-phase electrical distribution systems are electrically isolated from each other, but operate as a single multi-phase electrical distribution system.

* * * * *